(12) United States Patent
Negami

(10) Patent No.: US 10,435,547 B2
(45) Date of Patent: Oct. 8, 2019

(54) HALOGENATED BUTYL RUBBER COMPOSITION AND VIBRATION-INSULATING GROMMET

(71) Applicant: NOK CORPORATION, Tokyo (JP)

(72) Inventor: Tetsuro Negami, Tottori (JP)

(73) Assignee: NOK Corporation, Tokyo (JP)

( * ) Notice: Subject to any disclaimer, the term of this patent is extended or adjusted under 35 U.S.C. 154(b) by 35 days.

(21) Appl. No.: 15/740,724

(22) PCT Filed: Jul. 26, 2016

(86) PCT No.: PCT/JP2016/071911
§ 371 (c)(1),
(2) Date: Dec. 28, 2017

(87) PCT Pub. No.: WO2017/018426
PCT Pub. Date: Feb. 2, 2017

(65) Prior Publication Data
US 2018/0186980 A1 Jul. 5, 2018

(30) Foreign Application Priority Data

Jul. 28, 2015 (JP) .................... 2015-148414

(51) Int. Cl.
| | | |
|---|---|---|
| C08L 9/00 | (2006.01) | |
| C08L 15/02 | (2006.01) | |
| C08K 5/20 | (2006.01) | |
| C08L 23/28 | (2006.01) | |
| F16F 15/08 | (2006.01) | |
| F16F 1/373 | (2006.01) | |

(52) U.S. Cl.
CPC ............ C08L 15/02 (2013.01); C08K 5/20 (2013.01); C08L 9/00 (2013.01); C08L 23/28 (2013.01); F16F 1/3732 (2013.01); F16F 15/08 (2013.01)

(58) Field of Classification Search
CPC ... C08K 5/20; C08L 9/00; C08L 15/02; C08L 23/28; F16F 1/3732; F16F 15/08
See application file for complete search history.

(56) References Cited

U.S. PATENT DOCUMENTS

| | | | | |
|---|---|---|---|---|
| 2003/0191224 A1* | 10/2003 | Maruyama et al. | ..... | C08K 9/04 524/445 |
| 2004/0016493 A1 | 1/2004 | Sandstrom et al. | | |
| 2014/0243444 A1* | 8/2014 | Ikari et al. | ............ | C08F 299/00 522/28 |

FOREIGN PATENT DOCUMENTS

| | | |
|---|---|---|
| JP | 62-135552 | 6/1987 |
| JP | 05-059235 | 3/1993 |
| JP | 05-0140385 | 6/1993 |
| JP | 06-015647 | 3/1994 |
| JP | 2003-335902 A | 11/2003 |
| JP | 2004-175994 | 6/2004 |
| JP | 2004-204204 A | 7/2004 |
| JP | 2005-320524 | 11/2005 |

OTHER PUBLICATIONS

Extended European Search Report and Written Opinion received in connection with European application No. EP 16830531.6; dated Nov. 30, 2018.
Office Action received in connection with Japanese Application No. 2017-502285; dated Feb. 14, 2018 (with English translation of the Office Action).
NOK Corporation Catalog (2015) 36 pages with English translation of p. 12.
International Search Report and Written Opinion received in connection with international application No. PCT/JP2016/071911; dated Oct. 25, 2016. (with English translation of the international search report).
Office Action received in connection with Japanese Application No. 2017-502285; dated Oct. 27, 2017 (with English translation of the Office Action).

* cited by examiner

*Primary Examiner* — Nathan M Nutter
(74) *Attorney, Agent, or Firm* — The Marbury Law Group, PLLC

(57) ABSTRACT

Provided are a halogenated butyl rubber composition which can be made low in hardness, being excellent in damping property and having excellent balance of the physical properties among kneading, roll-processing and crosslinking, and a vibration-insulating grommet using the halogenated butyl rubber composition. The halogenated butyl rubber composition contains 100 parts mass of halogenated butyl rubber and 3 to 20 parts mass of liquid unsaturated polybutadiene, and preferably further contains 0.1 to 5 parts mass of fatty acid amide. The halogenated butyl rubber composition is suitable for producing a vibration-insulating grommet.

5 Claims, No Drawings

HALOGENATED BUTYL RUBBER COMPOSITION AND VIBRATION-INSULATING GROMMET

RELATED APPLICATIONS

This application is a national phase entry of international patent application PCT/JP2016/071911 filed Jul. 26, 2016, which claims benefit of priority to Japanese Application Serial No. 2015-148414, filed Jul. 28, 2015, the entire disclosures of which are incorporated herein by reference in their entireties.

FIELD OF INVENTION

The present invention relates to a halogenated butyl rubber composition and a vibration-insulating grommet using the same.

BACKGROUND ART

A vibration-insulating grommet is widely used in the fields of an automobile, an electronics product and a general industrial machine. Particularly in an automobile field, a vibration-insulating grommet is used broadly as a vibration-insulating material including a mechanism component such as an ABS (antilock brake system), an EBS (electronically controlled brake system or regenerative braking system) and an ESC (electronic stability control or slip prevention device) of a brake control unit, an engine auxiliary unit, and a pipe of a fuel cell vehicle.

The vibration-insulating grommet, which mainly works to reduce vibration transmissibility and control displacement of a support body, is required to work variously dependent on a target for which the vibration transmissibility should be reduced. For example, in case of an ECB of a brake control unit, the required performance is to protect and support a machine against vibration transmitted from a road surface, or reduce vibration transmitted to a vehicle interior when switching a relay switch. Further, in case of a fuel cell vehicle, the required performance is to support stack wiring with vibration-insulating.

As mentioned above, a rubber material used for a vibration-insulating grommet is required to have the following properties.

(1) A high damping property for the purpose of reducing vibration of a target (especially in resonance).

(2) A wide range of hardness variation (i.e., hardness form 10° to 70°) for exerting a vibration-insulating effect in a wide frequency band. Particularly in recent years, it is required to have low hardness for the purpose of reducing a weight of a component unit (e.g., hardness of 60° or less, preferably 50° or less, more preferably 40° or less).

(3) Excellent in kneading, roll-processing and crosslinking performance of a rubber material.

(4) No silicon compound contained for the purpose of avoiding component contamination and defectiveness of electric circuit/relay contact.

Here, a rubber material fulfilling the above properties and applicable to a vibration-insulating grommet includes butyl rubber. Butyl rubber has an excellent damping property over a wide range of frequency bands, and is excellent in shock absorption and energy absorption. Further, butyl rubber has a relatively small degree of unsaturation, leading to excellent in weather resistance, heat resistance and ozone resistance.

Conventionally, a variety of compositions have been studied in order to improve the performance of a vibration-insulating rubber via using butyl rubber as a rubber material. For example, Patent Document 1 discloses a vibration-insulating rubber composition to which silicon oil is added for increasing damping performance and decreasing adhesiveness of butyl based rubber so that the procesability and formability of the vibration-insulating rubber composition are improved.

DOCUMENTS OF PRIOR ART

Patent Documents

Patent Document 1: Japanese Unexamined Patent Application Publication No. Hei 5-59235

SUMMARY OF INVENTION

Problems to be Solved by Invention

Here, it should be noted that recent vibration-insulating grommets are demanded to have higher performance, and therefore, development of vibration-insulating grommets with more improved performance is demanded. This requires improvement in the performance of vibration-insulating rubber compositions.

The present invention has been made in view of the above circumstance. Thus, an object of the present invention is to provide a halogenated butyl rubber composition with low hardness and excellent damping performance, and having good balance of physical properties among kneading, roll-processing and crosslinking. Further, another object is to provide a vibration-insulating grommet using said vibration-insulating rubber composition.

Means for Solving Problems

The present inventors have keenly investigated the vibration-insulating rubber composition for solving the above problem. This results in findings that halogenated butyl rubber is excellent in damping performance and can be made to have low hardness. Hence, halogenated butyl rubber has been selected to be used for a basic rubber material.

Further, the present inverters have examined a variety of plasticizers which are valid for halogenated butyl rubber in order not only to keep suitable properties of a basic rubber material but also to improve balance of physical properties among kneading, roll-processing, and crosslinking. As a result, liquid unsaturated polybutadiene has been identified suitable for such a plasticizer. Eventually, the present invention has been achieved based on the above findings.

More specially, the present invention is a halogenated butyl rubber composition containing 100 parts mass of halogenated butyl rubber and 3 to 20 parts mass of liquid unsaturated polybutadiene. Preferably, the halogenated butyl rubber composition of the present invention contains 0.1 to 5 parts mass of a fatty acid amide. Moreover, preferably a number average molecular weight of the liquid unsaturated polybutadiene is 5000 or less. Accordingly, the halogenated butyl rubber composition of the present invention has properties suitable for producing a vibration-insulating grommet.

Effect of Invention

The halogenated butyl rubber composition of the present invention can be made to have low hardness and excellent damping performance, having good balance in physical properties among kneading, roll-processing and crosslinking. Further, the vibration-insulating grommet of the present invention has low hardness and excellent damping performance.

EMBODIMENTS FOR CARRYING OUT INVENTION

Hereinafter, embodiments of the present invention will be described in detail. However, the scope of the present invention is not limited to those embodiments.

A halogenated butyl rubber composition of the present embodiment contains 100 parts mass of halogenated butyl rubber and 3 to 20 parts mass of liquid unsaturated polybutadiene. Next, each component constructing the present embodiment will be described.

(Halogenated Butyl Rubber)

Butyl rubber is a low rebounding elastic material and excellent in shock absorption and energy absorption, which is suitably used for a vibration-insulating rubber (or vibration-insulating grommet). Further, butyl rubber is prepared by copolymerization between isobutylene and a small amount of isoprene. The butyl rubber has a relatively small degree of unsaturation and is chemically stable. Thus, the butyl rubber is excellent in weather resistance, heat resistance and ozone resistance. Moreover, the butyl rubber can be made as a low hardness-rubber with hardness (i.e., JIS A hardness) of 40° or less, having superior electric insulation, corona resistance, tracking resistance and gas barrier property.

However, the butyl rubber has a disadvantage such as a lower crosslinking rate due to a small number of double bonds in a main chain. Therefore, halogenated butyl rubber introduced with a halogen therein has been developed to improve the disadvantage. The halogenated butyl rubber is classified into two types: chlorinated butyl rubber and brominated butyl rubber. Both types have butyl rubber properties of low rebounding elasticity, weather resistance, heat resistance, ozone resistance and electric properties as well as superior characteristics of a high crosslinking rate.

When comparing chlorinated butyl rubber to brominated butyl rubber, the chlorinated butyl rubber has a superior Mooney scorch property to the brominated one. For this reason, the chlorinated butyl rubber is more preferable as the halogenated butyl rubber of the present invention than the brominated one.

The halogenated butyl rubber is classified by a degree of unsaturation (or a degree of isoprene), and Mooney viscosity. Standard halogenated butyl rubber has a degree of unsaturation in the range from 0.6 to 2.5 mol %, Mooney viscosity in the range from 18 to 90. Further, the standard halogenated butyl rubber has the halogen content in the range from 1.1 to 2.4 wt %.

Here, it should be noted that the halogenated butyl rubber has defects, that is, firmness characteristics and slightly inferior properties in roll-processing and crosslinking. Thus, the present inventors have searched for plasticizers suitable for preparing the halogenated butyl rubber so as to improve balance of the physical properties among kneading, roll-processing and crosslinking with keeping usable properties of halogenated butyl rubber. As a result, the present inventors have found out that liquid unsaturated polybutadiene is a suitable plasticizer for preparing the halogenated butyl rubber.

(Liquid Unsaturated Polybutadiene)

Liquid unsaturated polybutadiene is a low molecular weight polymer of butadiene, and liquid at a room temperature. Actually, addition of the liquid unsaturated polybutadiene may soften butyl rubber thereby to improve the kneading and roll-processing properties and give the rubber low hardness.

Preferably, the liquid unsaturated polybutadiene has a degree of unsaturation with the iodine number in the range from 22 to 600 (g/100 g).

Further, preferably the liquid unsaturated polybutadiene has the number average molecular weight of 5000 or less, more preferably in the range from 1000 to 4000 in order to effectively work as a plasticizer and a crosslinking agent.

The content of the liquid unsaturated polybutadiene is set in the range from 3 to 20 parts mass per 100 parts mass of the halogenated butyl rubber. That range of the content may improve the roll-processing and crosslinking properties of the halogenated butyl rubber. In contrast, the roll-processing and crosslinking properties tend to be deteriorated when the liquid unsaturated polybutadiene has the content of less than 3 parts mass, while the crosslinking property tends to be deteriorated when the content thereof is more than 20 parts mass.

A variety of functional groups may be introduced to the liquid unsaturated polybutadiene via chemical modification. For example, a hydroxyl group, an acrylic group, a carboxyl group, an isocyanate group, and a maleic acid group may be introduced into both ends of the polybutadiene molecule. Further, an epoxy group may be introduced therein via oxidation of a vinyl group. Those chemical modifications enable improvement in the solubility, compatibility and crosslinking performance of the liquid unsaturated polybutadiene.

(Fatty Acid Amide)

Addition of a fatty acid amide is effective for improving the balance of the physical properties among kneading, roll-processing and crosslinking properties of the butyl rubber composition. The fatty acid amide also works as a lubricant. Addition of a small amount of a fatty acid amide has an effect for improving properties of the butyl rubber composition, especially the roll-processing property. In the halogenated butyl rubber composition of the present embodiment, preferably 0.1 to 5 parts mass of the fatty acid amide is contained per 100 parts mass of the halogenated butyl rubber. Note, a problem may be caused on the crosslinking property of the halogenated butyl rubber composition when the added amount of the fatty acid amide is more than 5 parts mass.

As the fatty acid amide, usable are known fatty acid amides such as oleic acid amide, erucic acid amide, stearic acid amide, palmitic acid amide, lauric acid amide, behenic acid amide, ethylene bis-erucic acid amide, hexamethylene bis-oleic acid amide. In view of a kneading property, oleic acid amid is preferable as the fatty acid amide of the present invention.

The halogenated butyl rubber composition of the present embodiment is added with a crosslinking agent, or a crosslinking agent with a crosslinking aid in order to carry out crosslinking. The crosslinking of the halogenated butyl rubber includes a bridge formation by sulfur (or vulcanization), a sulfur donating compound, quinoid, a resin, and zinc oxide. Known technical knowledge is applicable to select a crosslinking agent, a crosslinking aid, a crosslinking method, and crosslinking conditions.

Where necessary, various conventionally known additives may be appropriately added to the halogenated butyl rubber composition of the present invention so long as the object of the present invention is not harmed. Such additives include a rubber reinforcement agent, inorganic filler, a plasticizer, a softener, an antioxidant, a processing aid, a forming agent, a forming aid, a coloring agent, a dispersant, a flame retardant, a tackifier and a parting agent.

As mentioned above, the halogenated butyl rubber of the present invention may be made low in hardness, excellent in a damping property, and have excellent balance of physical properties among kneading, roll-processing and crosslinking. Thus, the halogenated butyl rubber of the present invention satisfies various characteristics required for a vibration-insulating grommet so that the halogenated butyl rubber of the present invention is a useful rubber composition for preparing a vibration-insulating grommet.

EXAMPLES

Hereinafter, the present invention will be described in more detail referring to the following Examples.

Raw materials used for preparing rubber compositions in Examples and Comparative Examples are listed below.

(i) Halogenated Butyl Rubber Chlorinated butyl rubber: JSR Co., Chloro Butyl 1066 Brominated butyl rubber: JSR Co., Bromo Butyl 2244

(ii) Fatty Acid Amide Oleic acid amide: Lion Specialty Chemicals Co., Ltd., Armoslip CP-P (iii) Plasticizer Liquid polybutadiene A: Nippon Soda Co., Ltd., Nisso-PB B-3000, number average molecular weight 3200

Liquid polybutadiene B: Nippon Soda Co., Ltd., Nisso-PB B-2000, number average molecular weight 2100

Liquid polybutadiene C: Nippon Soda Co., Ltd., Nisso-PB B-1000, number average molecular weight 1100

Both-end hydroxy group-terminated liquid polybutadiene: Nippon Soda Co., Ltd., Nisso-PB G-1000, number average molecular weight 1400

Terminal acryl group introduced liquid polybutadiene: Nippon Soda Co., Ltd., Nisso-PB EMA-3000, number average molecular weight 3100

Hydrogenated liquid polybutadiene: Nippon Soda Co., Ltd., Nisso-PB BI-3000, number average molecular weight 3000

Both-end hydroxy group-terminated hydrogenated liquid polybutadiene: Nippon Soda Co., Ltd., Nisso-PB GI-3000, number average molecular weight 3000

Liquid polyolefin oligomer: Mitsui Chemicals, Inc., Lucant HC2000

Liquid polybutene: NOF Co., NOF polybutene 40SH

Ester based plasticizer: Taoka Chemical Co., Ltd, DOS

Paraffin based plasticizer: Idemitsu Kosan Co., Ltd., PW380

Note, among the above plasticizers, liquid polybutadiene A, liquid polybutadiene B, liquid polybutadiene C, both-end hydroxy group-terminated liquid polybutadiene and terminal acryl group introduced liquid polybutadiene are liquid unsaturated polybutadienes. On the contrary, hydrogenated liquid polybutadiene and both-end hydroxy group-terminated hydrogenated liquid polybutadiene are liquid saturated polybutadienes.

(iv) Crosslinking Agent

Crosslinking agent: zinc oxide, 15 parts mass

Crosslinking agent: brominated alkylphenol-formaldehyde resin, 1.5 parts mass

Examples 1-10; Comparative Examples 1-8

As Examples and Comparative Examples, uncrosslinking rubber compositions were prepared by adding the above described plasticizers respectively to the row material compositions listed in Tables 1 and 2. Each of the resulting rubber compositions was kneaded for 30 min by a pressure kneader, whereby a kneaded mixture was obtained. Then, the kneaded mixture was taken out from the pressure kneader, and processed by an open roll to be a sheet-like rubber with a thickness of about 3-8 mm. The evaluation points are listed below.

(Kneading Performance)

An uncrosslinking rubber composition was kneaded by a pressure kneader. Herein, if the kneading was performed within 30 min and the pressure kneader was not contaminated after discharging a rubber material, the kneading performance was determined to be "good". However, if not, the kneading performance was determined to be "poor".

(Roll-Processing Performance)

Roll-pressing performance was evaluated by performing sheeting work with respect to an uncrosslinking rubber composition via using an open roll.

(i) A surface of a rubber material has law adhesiveness.

(ii) No interruption occurs by adhesiveness while performing sheeting work such as turning work for improving dispersibility and sheet feeding work, and the roll-processability is good.

(iii) No excessive shrinkage deformation occurs and the roll-takeout property is good, at the sheeting work.

It is preferable to satisfy the above 3 evaluation points.

The roll-processing performance was determined to be "good" when all of the 3 points were satisfied, "average" when either of the 3 points was unsatisfied, and "poor" when 2 or 3 points were unsatisfied. Herein, a composition showing the most excellent roll-processing performance among the compositions determined to be good in all of the 3 points was determined to be "excellent".

(Crosslinking Performance)

Using an uncrosslinked rubber sheet with a thickness of 3-8 mm, crosslinking was performed under the conditions of 180° C. and 6 min, thereby to prepare a crosslinked sheet with a thickness of 2 mm.

(i) Crosslinked sheet can be formed.

(ii) No flow mark and burning mark are left on a crosslinked molded sheet, and the molded sheet has good appearance.

(iii) No bleeding occurs on a surface of a crosslinked sheet, and the surface adhesiveness is small.

It is preferable to satisfy the above 3 evaluation points. The crosslinking performance was determined to be "good" when all of the 3 points were satisfied, "average" when only point (ii) was unsatisfied, and "poor" when either of points (i) and (iii) was unsatisfied. Herein, a composition showing the most excellent crosslinking performance among the compositions determined to be good in all of the 3 points was determined to be "excellent".

(Mooney Scorch)

Mooney scorch is a physical property relevant to crosslinking processability. A scorch time (t5) was measured by using "Rotorless Mooney Viscometer (RLM-1 type); Toyo Seiki Seisaku-Sho, Ltd." at the test temperature of 125° C. A material with a faster scorch time (t5) was determined to have poorer scorch performance (i.e., liable to cause material burning).

Each Mooney scorch was determined to be "poor" when the scorch time (t5) was≤2 min, "average" when t5 was>2 min and<5 min, and "good" when t5 was≥5 min.

(Hardness)

Hardness (Hs) was measured by using a hardness durometer (Durometer type A) following JIS K6253:1997 (instant). A material with the hardness of 60° or less was determined to be "good".

(Tan δ)

"tan δ" is a value of physical property relevant to damping performance. The value was measured following JIS K6394: 2007.

Test Conditions: Tensile Testing Method

Shape and Size of Test Piece: strip form, length of 6 mm, thickness of 2 mm, gripper distance of 20 mm, average strain of 10%, strain amplitude of +0.5%, frequency of 50 Hz, and test temperature of 23° C.

Preferably, tan δ has a value of 0.6 or more. A test piece with tan δ of 0.6 or more was determined to be "good", tan δ in the range from 0.5 to 0.6 was determined to be "average", and tan δ of less than 0.5 was determined to be "poor".

Tables 1 and 2 show the results in the above evaluations.

TABLE 1

| | Component/Evaluation Point | Trade Name | Manufacturer | Example 1 | Example 2 | Example 3 | Example 4 |
|---|---|---|---|---|---|---|---|
| Composition of Raw Material (parts mass) | Chlorinated Butyl Rubber | JSC Chloro Butyl 1066 | JSR | 100 | 100 | 100 | 100 |
| | Brominated Butyl Rubber | JSC Bromo Butyl 2244 | JSR | — | — | — | — |
| | Oleic Amide | Armoslip CP-C | Lion SC | — | — | — | 1 |
| | Liquid Polybutadiene A | Nisso-PB B-3000 | Nippon Soda | 20 | 10 | 3 | 20 |
| | Liquid Polybutadiene B | Nisso-PB B-2000 | Nippon Soda | — | — | — | — |
| | Liquid Polybutadiene C | Nisso-PB B-1000 | Nippon Soda | — | — | — | — |
| | Both-end Hydroxy group-terminated Liquid Polybutadiene | Nisso-PB G-1000 | Nippon Soda | — | — | — | — |
| | Terminal Acryl group introduced Liquid Polybutadiene | Nisso-PB EMA-3000 | Nippon Soda | — | — | — | — |
| | Hydrogenated Liquid Polybutadiene | Nisso-PB BI-3000 | Nippon Soda | — | — | — | — |
| | Both-end Hydroxy group-terminated Hydrogenated Liquid Polybutadiene | Nisso-PB GI-3000 | Nippon Soda | — | — | — | — |
| | Liquid Polyolefin Oligomer | Lucant HC2000 | Mitsui Chemical | — | — | — | — |
| | Liquid Polybutene | NOF Polybutene 40SH | NOF | — | — | — | — |
| | Ester based Plasticizer | DOS | Taoka Chemical | — | — | — | — |
| | Paraffin Based Plasticizer | PW380 | Idemitsu Kosan | — | — | — | — |
| Physical Property | Kneading | | | good | good | good | good |
| | Roll-Processing | | | good | good | good | excellent |
| | Crosslinking | | | excellent | excellent | good | excellent |
| | Mooney Scorch | 125° C., t5 | | ≥30 min good | ≥30 min good | 17 min good | ≥30 min good |
| | Hardness Hs | Durometer A (Instant) | | 30 | 34 | 37 | 29 |
| | tan δ | RT, 50 Hz | | 0.80 good | 0.75 good | 0.72 good | 0.79 good |

| | Component/Evaluation Point | Example 5 | Example 6 | Example 7 | Example 8 | Example 9 | Example 10 |
|---|---|---|---|---|---|---|---|
| Composition of Raw Material (parts mass) | Chlorinated Butyl Rubber | 100 | 100 | 100 | 100 | 100 | — |
| | Brominated Butyl Rubber | — | — | — | — | — | 100 |
| | Oleic Amide | 5 | — | — | — | — | — |
| | Liquid Polybutadiene A | 20 | — | — | — | — | 20 |
| | Liquid Polybutadiene B | — | 20 | — | — | — | — |
| | Liquid Polybutadiene C | — | — | 20 | — | — | — |
| | Both-end Hydroxy group-terminated Liquid Polybutadiene | — | — | — | 20 | — | — |
| | Terminal Acryl group introduced Liquid Polybutadiene | — | — | — | — | 20 | — |
| | Hydrogenated Liquid Polybutadiene | — | — | — | — | — | — |
| | Both-end Hydroxy group-terminated Hydrogenated Liquid Polybutadiene | — | — | — | — | — | — |
| | Liquid Polyolefin Oligomer | — | — | — | — | — | — |
| | Liquid Polybutene | — | — | — | — | — | — |
| | Ester based Plasticizer | — | — | — | — | — | — |
| | Paraffin Based Plasticizer | — | — | — | — | — | — |
| Physical Property | Kneading | good | good | good | good | good | good |
| | Roll-Processing | excellent | good | good | good | good | good |
| | Crosslinking | good | excellent | excellent | good | good | good |
| | Mooney Scorch | ≥30 min good | ≥30 min good | ≥30 min good | ≥30 min good | ≥30 min good | 3 min average |
| | Hardness Hs | 23 | 29 | 27 | 31 | 30 | 34 |
| | tan δ | 0.82 good | 0.75 good | 0.68 good | 0.81 good | 0.80 good | 0.76 good |

TABLE 2

| | Component/Evaluation Point | Trade Name | Manufacturer | Comparative Example 1 | Comparative Example 2 | Comparative Example 3 |
|---|---|---|---|---|---|---|
| Composition of Raw Material (parts mass) | Chlorinated Butyl Rubber | JSC Chloro Butyl 1066 | JSR | 100 | 100 | 100 |
| | Brominated Butyl Rubber | JSC Bromo Butyl 2244 | JSR | — | — | — |
| | Oleic Amide | Armoslip CP-C | Lion SC | — | — | — |
| | Liquid Polybutadiene A | Nisso-PB B-3000 | Nippon Soda | 30 | — | — |

TABLE 2-continued

|  | Component/Evaluation Point |  |  |  |  |  |
|---|---|---|---|---|---|---|
|  | Liquid Polybutadiene B | Nisso-PB B-2000 | Nippon Soda | — | — | — |
|  | Liquid Polybutadiene C | Nisso-PB B-1000 | Nippon Soda | — | — | — |
|  | Both-end Hydroxy group-terminated Liquid Poybutadiene | Nisso-PB G-1000 | Nippon Soda | — | — | — |
|  | Terminal Acryl group introduced Liquid Polybutadiene | Nisso-PB EMA-3000 | Nippon Soda | — | — | — |
|  | Hydrogenated Liquid Polybutadiene | Nisso-PB BI-3000 | Nippon Soda | — | — | 20 |
|  | Both-end Hydroxy group-terminated Hydrogenated Liquid Polybutadiene | Nisso-PB GI-3000 | Nippon Soda | — | — | — |
|  | Liquid Polyolefin Oligomer | Lucant HC2000 | Mitsui Chemical | — | — | — |
|  | Liquid Polybutene | NOF Polybutene 40SH | NOF | — | — | — |
|  | Ester based Plasticizer | DOS | Taoka Chemical | — | — | — |
|  | Paraffin Based Plasticizer | PW380 | Idemitsu Kosen | — | — | — |
| Physical Property | Kneading |  |  | good | good | poor |
|  | Roll-Processing |  |  | good | average | poor |
|  | Crosslinking |  |  | poor | average | average |
|  | Mooney Scorch | 125° C., t5 |  | ≥30 min good | 9 min good | 4 min average |
|  | Hardness Hs | Durometer A (Instant) |  | 22 | 38 | 29 |
|  | tan δ | RT, 50 Hz |  | 0.85 good | 0.70 good | 0.76 good |

|  | Component/Evaluation Point | Comparative Example 4 | Comparative Example 5 | Comparative Example 6 | Comparative Example 7 | Comparative Example 8 |
|---|---|---|---|---|---|---|
| Composition of Raw Material (parts mass) | Chlorinated Butyl Rubber | 100 | 100 | 100 | 100 | 100 |
|  | Brominated Butyl Rubber | — | — | — | — | — |
|  | Oleic Amide | — | — | — | — | — |
|  | Liquid Polybutadiene A | — | — | — | — | — |
|  | Liquid Polybutadiene B | — | — | — | — | — |
|  | Liquid Polybutadiene C | — | — | — | — | — |
|  | Both-end Hydroxy group-terminated Liquid Poybutadiene | — | — | — | — | — |
|  | Terminal Acryl group introduced Liquid Polybutadiene | — | — | — | — | — |
|  | Hydrogenated Liquid Polybutadiene | — | — | — | — | — |
|  | Both-end Hydroxy group-terminated Hydrogenated Liquid Polybutadiene | 20 | — | — | — | — |
|  | Liquid Polyolefin Oligomer | — | 20 | — | — | — |
|  | Liquid Polybutene | — | — | 20 | — | — |
|  | Ester based Plasticizer | — | — | — | 20 | — |
|  | Paraffin Based Plasticizer | — | — | — | — | 20 |
| Physical Property | Kneading | poor | poor | poor | good | poor |
|  | Roll-Processing | poor | poor | poor | good | poor |
|  | Crosslinking | average | average | average | average | average |
|  | Mooney Scorch | 2 min poor | ≥30 min good | 18 min good | 14 min good | ≥30 min good |
|  | Hardness Hs | 33 | 28 | 30 | 26 | 28 |
|  | tan δ | 0.68 good | 0.59 average | 0.74 good | 0.43 poor | 0.59 average |

Examples 1-3 were rubber compositions prepared by adding liquid polybutadiene A into the chlorinated butyl rubber. Those compositions showed preferable values in the evaluations of kneading, roll-processing, crosslinking, Mooney scorch, hardness, and damping (tan δ) tests. Examples 1 and 2 were particularly excellent in the crosslinking performance.

Examples 4 and 5 were rubber compositions prepared by further adding oleic acid amide to the rubber composition of Example 1. Those compositions were particularly excellent in the roll-processing performance, and further showed preferable values in other physical properties. Herein, particularly Example 4 was excellent in the crosslinking performance.

Examples 6-9 were rubber compositions prepared by respectively adding liquid polybutadiene B, liquid polybutadiene C, both-end hydroxy group-terminated liquid polybutadiene, terminal acryl group introduced liquid polybutadiene into the chlorinated butyl rubber. Those compositions showed preferable values in the evaluations of kneading and roll-processing performance as well as other physical properties. Note, Examples 6 and 7 prepared by respectively adding liquid polybutadiene B and liquid polybutadiene C to the chlorinated butyl rubber were particularly excellent in the crosslinking performance.

Example 10 was a rubber composition prepared by adding liquid polybutadiene A to the brominated butyl rubber. Comparing to Example 1 using the chlorinated butyl rubber, decrease in the Mooney scorch was detected. This result was attributed to the higher reactivity of the brominated butyl rubber than that of the chlorinated butyl rubber, and higher sensitivity to heat. However, Example 10 showed preferable values in the evaluations of other properties.

Comparative Example 1 was a rubber composition prepared by adding 30 parts mass of liquid polybutadiene A into 100 parts mass of the chlorinated butyl rubber. Due to the larger amount of the liquid polybutadiene thus added, decrease in the crosslinking performance was detected.

Comparative Example 2 was a rubber composition prepared without adding any of liquid polybutadiene into the chlorinated butyl rubber. In the physical properties of roll-processing and crosslinking decrease in the performance was detected.

Comparative Example 3 was a rubber composition prepared by adding hydrogenated polybutadiene as liquid saturated polybutadiene into the chlorinated butyl rubber. In the physical properties of kneading, roll-processing, crosslinking and Mooney scorch, decrease in the performance was detected.

Comparative Example 4 was a rubber composition prepared by adding both-end hydroxy group-terminated hydrogenated liquid polybutadiene as liquid saturated polybutadiene into the chlorinated butyl rubber. Similarly to Comparative Example 3, in the physical properties of kneading, roll-processing, crosslinking and Mooney scorch, decrease in the performance was detected.

Comparative Example 5 was a rubber composition prepared by adding liquid polyolefin oligomer into the chlorinated butyl rubber. In the physical properties of kneading, roll-processing, crosslinking and tan δ, decrease in the performance was detected.

Comparative Example 6 was a rubber composition prepared by adding liquid polybutene into the chlorinated butyl rubber. In the physical properties of kneading, roll-processing and crosslinking, decrease in the performance was detected.

Comparative Example 7 was a rubber composition prepared by adding ester based plasticizer into the chlorinated butyl rubber. In the physical property of crosslinking and tan δ, decrease in the performance was detected.

Comparative Example 8 was a rubber composition prepared by adding paraffin based plasticizer into the chlorinated butyl rubber. In the physical properties of kneading, roll-processing, crosslinking and tan δ, decrease in the performance was detected.

The invention claimed is:

1. A halogenated butyl rubber composition comprising 100 parts mass of halogenated butyl rubber and 3 to 20 parts mass of liquid unsaturated polybutadiene, wherein
   the halogenated butyl rubber has a halogen content in the range from 1.1 to 2.4 wt %, and
   the liquid unsaturated polybutadiene has a degree of unsaturation with the iodine number in the range from 22 to 600 (g/100 g).

2. The halogenated butyl rubber composition described in claim 1, further comprising 0.1 to 5 parts mass of fatty acid amide.

3. The halogenated butyl rubber composition described in claim 1, wherein the liquid unsaturated polybutadiene has a number average molecular weight of 5000 or less.

4. The halogenated butyl rubber composition described in claim 1, wherein the halogenated butyl rubber composition is used for a vibration-insulating grommet.

5. A vibration-insulating grommet made of the halogenated butyl rubber composition described in claim 1, wherein the grommet has tan δ of 0.5 or more.

* * * * *